(12) United States Patent
Berghammer (10) Patent No.: US 10,190,723 B2
(45) Date of Patent: Jan. 29, 2019

(54) INSULATING MOLDED PART AND METHOD FOR THE PRODUCTION THEREOF

(76) Inventor: Siegfried Berghammer, Linz (AT)

( * ) Notice: Subject to any disclaimer, the term of this patent is extended or adjusted under 35 U.S.C. 154(b) by 1393 days.

(21) Appl. No.: 13/497,891

(22) PCT Filed: Jun. 17, 2010

(86) PCT No.: PCT/AT2010/000224
§ 371 (c)(1),
(2), (4) Date: Jul. 16, 2012

(87) PCT Pub. No.: WO2011/035352
PCT Pub. Date: Mar. 31, 2011

(65) Prior Publication Data
US 2012/0276326 A1  Nov. 1, 2012

(30) Foreign Application Priority Data
Sep. 24, 2009  (AT) .............................. GM 594/2009

(51) Int. Cl.
*F16L 59/065* (2006.01)
*B29C 33/52* (2006.01)
(Continued)

(52) U.S. Cl.
CPC ............ *F16L 59/065* (2013.01); *B29C 33/52* (2013.01); *B29C 44/583* (2013.01); *B29C 45/0013* (2013.01); *B29C 45/16* (2013.01); *B29C 70/66* (2013.01); *B32B 3/08* (2013.01); *B32B 3/12* (2013.01); *B32B 5/18* (2013.01); *B32B 5/22* (2013.01); *B32B 5/32* (2013.01); *B32B 7/005* (2013.01); *E04B 1/803* (2013.01);
(Continued)

(58) Field of Classification Search
CPC ... B29C 44/583; B29C 45/0013; B29C 70/66; B32B 27/40; B32B 3/00; B32B 3/02; B32B 5/18; E04B 1/803; F16L 59/065; Y10T 428/24149
USPC .................. 264/478; 428/116, 188, 131–140
See application file for complete search history.

(56) References Cited

U.S. PATENT DOCUMENTS 4,513,041 A * 4/1985 Delluc .................... E04B 1/803
                                                                181/288
5,683,799 A * 11/1997 Olinger ..................... 428/313.9
(Continued)

FOREIGN PATENT DOCUMENTS

DE    43 24 718    2/1994
DE    42 40 017    6/1994
(Continued)

OTHER PUBLICATIONS

3M Glass Bubbles K37 copyright 2010.*

*Primary Examiner* — Frank J Vineis
*Assistant Examiner* — Alicia J Sawdon
(74) *Attorney, Agent, or Firm* — Greenblum & Bernstein, P.L.C.

(57) ABSTRACT

Insulating molded part having an upper part and a bottom part. The upper part and bottom part are formed as an integral injection molded or die-cast part. Further, cavities, between the upper part and the bottom part, are arranged as chambers separated from one another in an air-tight manner and the upper part and the bottom part are formed in respective cuboid manners, and the upper part is offset in a diagonal direction in relation to the bottom part.

23 Claims, 3 Drawing Sheets

(51) Int. Cl.
  *B29C 44/58* (2006.01)
  *B29C 45/00* (2006.01)
  *B29C 45/16* (2006.01)
  *B29C 70/66* (2006.01)
  *B32B 5/18* (2006.01)
  *E04B 1/80* (2006.01)
  *B32B 5/22* (2006.01)
  *B32B 5/32* (2006.01)
  *B32B 7/00* (2006.01)
  *B32B 3/08* (2006.01)
  *B32B 3/12* (2006.01)
  *B29K 105/16* (2006.01)
  *B29K 709/08* (2006.01)

(52) U.S. Cl.
  CPC .... *B29K 2105/165* (2013.01); *B29K 2709/08* (2013.01); *B32B 2264/06* (2013.01); *B32B 2264/067* (2013.01); *B32B 2264/10* (2013.01); *B32B 2264/101* (2013.01); *B32B 2266/0271* (2013.01); *B32B 2266/0278* (2013.01); *B32B 2307/304* (2013.01); *B32B 2307/7242* (2013.01); *B32B 2419/00* (2013.01); *B32B 2607/00* (2013.01); *Y02A 30/242* (2018.01); *Y02A 30/248* (2018.01); *Y02B 80/12* (2013.01); *Y10T 428/24149* (2015.01)

(56) References Cited

U.S. PATENT DOCUMENTS

5,859,096 A * 1/1999 Hoge ..................... C04B 26/14
  523/219
2002/0014051 A1* 2/2002 Fraval ................... B28B 1/503
  52/794.1

FOREIGN PATENT DOCUMENTS

| | | |
|---|---|---|
| DE | 20 2004 004433 | 9/2004 |
| DE | 202006009620 U1 * | 11/2006 |
| DE | 10 2007 035851 | 8/2008 |
| DE | 10 2007 056837 | 5/2009 |
| DE | 102007056837 * | 5/2009 |
| DE | 102007056837 A1 * | 5/2009 |
| EP | 0 728 564 | 8/1996 |
| EP | 1 270 176 | 1/2003 |
| JP | 05/092441 | 4/1993 |
| WO | 99/06200 | 2/1999 |

* cited by examiner

INSULATING MOLDED PART AND METHOD FOR THE PRODUCTION THEREOF

CROSS-REFERENCE TO RELATED APPLICATIONS

The present application is a U.S. National Stage of International Patent Application No. PCT/AT2010/000224 filed Jun. 17, 2010, and claims priority under 35 U.S.C. §§ 119 and 365 of Austrian Patent Application No. GM 594/2009 filed Sep. 24, 2009. Moreover, the disclosure of International Patent Application No. PCT/AT2010/000224 is expressly incorporated by reference herein in its entirety.

BACKGROUND OF THE INVENTION

1. Field of the Invention

The invention relates to an insulating molded part with an upper part and a bottom part. The invention further relates to a method for the production of such an insulating molded part.

2. Discussion of Background Information

Insulating molding parts are known in which honeycomb-like structures are produced from metal for example, which are subsequently evacuated, i.e. placed under negative pressure, preferably under vacuum. Insulating molded parts of this kind show good thermal insulating properties as a result of the adverse thermal conduction of evacuated cavities. There are thermal bridges as a result of the metallic material however, and they are further relatively heavy and are expensive to produce. Furthermore, molding parts are known in which porous materials or a granulate are welded together in an air-impermeable film and the enclosed air is removed subsequently. Molding parts of this kind show limited shape retention and stability. Two-part and multi-part molding parts are known in which a compromise is sought between insulating capability and stability by using different materials. Molding parts of this kind lead to high manufacturing requirements and the resulting higher production costs.

SUMMARY OF THE EMBODIMENTS

The invention is directed to insulating molding parts which avoid the known disadvantages, are especially easy to produce at low cost and offer good insulating capability and high stability.

A claimed embodiment relates to an insulating molding part with an upper and a bottom part, wherein it is provided in accordance with the invention that the upper part and the bottom part are arranged as an integral injection-molded or die-cast part, which comprise cavities in their interior which are arranged as chambers which are respectively separated from one another in an air-tight fashion. Preferably, a vacuum is provided in the cavities because the insulating capability is increased thereby. Injection-molding or die-casting methods have not been proposed until now for the production of insulating molding parts with cavities that can be evacuated, and especially the integral arrangement of insulating molding parts with the help of these methods has not yet been tried. It has been noticed however that the production of an insulating molding part in accordance with the invention is not only possible by means of the injection-molding or die-casting method, but insulating molding parts are enabled which are superior to the known insulating molding parts with respect to their insulating capability. Moreover, injection-molding or die-casting methods can be performed at low cost.

As a result of the arrangement of the cavities as chambers which are respectively separated from one another in an air-tight manner, not only their production is simplified, which will be explained below in closer detail, but an easier processing of the insulating molding parts in accordance with the invention is enabled in practice because they can freely be cut to size without impairing the insulating capability of the entire molding part. Although air will reach the chambers that are affected by cutting and thereby reduce the vacuum, all other chambers will remain unaffected thereby and will continue to be under vacuum as a result of the air-tight separation. The practical application of the insulating molding parts in accordance with the invention, especially their mounting, will additionally be facilitated in such a way that the upper part and the bottom part are respectively arranged in the manner of a cuboid, and the upper part is slightly displaced in the diagonal direction in relation to the bottom part. As a result, they can be arranged to overlap one another on a building façade for example and can be installed as an overall area that insulates very well.

In accordance with a preferred embodiment, the upper part is made of a composite material with additions of natural materials or recycling materials. Natural materials shall be understood here as being rocks, wood, grass, hemp, clay or even soil, which can be used easily for injection-molding or die-casting methods with respective preparation, especially comminution, and can be processed in the upper part via a decorative surface with a visually appealing design. Conventional valuable materials such as wastepaper, cardboard, plastic, metal or glass can be used as a recycling material. Preferably, the bottom part is also made of a composite material with additions of natural materials or recycling materials.

It is understood that it is necessary to take the properties of the composite material for the upper and bottom part which are required for the injection-molding or die-casting methods into account. The composite material must have sufficient viscosity for the injection-molding or die-casting method. Furthermore, temperature ranges are proposed in accordance with the invention in which the composite material will cure. This will be discussed below in closer detail. It will merely be mentioned here that the composite material usually comprises a component which is also known as a "matrix resin". Differences are occasionally also made below between the matrix resin for the upper part and the bottom part, even though the same composite material can be used for both parts.

In accordance with the invention, a method is also proposed for producing an insulating molding part with an upper part and a bottom part. It is provided that in a first method step within the scope of an injection-molding or die-casting method the composite material of the upper part is introduced into a first mold with additions of natural materials or recycling material, and in a second method step within the scope of a lost-core method the composite material of the bottom part is introduced into a second mold with additions of natural materials or recycling material, with the second mold comprising a fusible core with the individual fusible bodies which are in connection with the outside via openings in the second mold, and the fusible bodies are molten down after the second method step for the formation of individual chambers. The openings are used in the known manner for melting down the fusible bodies and for the exit of the molten material into a heating bath for example, with subsequently cavities in form of chambers remaining. The combination of injection-molding or die-casting method and the lost-core method in accordance with the invention has not yet been proposed for the production of insulating molding parts with chamber-like cavities. Preferably, a negative pressure will be produced in the chambers after melting down the fusible core and thereafter the chambers are sealed in an air-tight manner. The application of a vacuum is not only provided for evacuating the cavities, but also offers the advantage that fusible core material and contaminating vapors produced in the course of curing of the insulating molding part are removed.

Preferably, the insulating molding part can be subjected to subsequent curing by means of UV radiation.

The composite material of the upper part and the bottom part has a viscosity at 25° C. of preferably 8,000 to 12,000 mPa·s (10,000 Centipoise) and cures at a temperature between 93.3° C. and 121.1° C. (200° F. und 250° F.). These physical properties allow optimal use for the method proposed in accordance with the invention.

It is proposed for the composition of the composite material of the upper part and the bottom part that it contains a matrix resin comprising a fluid phenolic resin, a glycidyl-terminated epoxy diluent, and at least one latent cross-linking agent. The epoxy diluent preferably concerns 1,4-diglycidyl oxybutane. The latent cross-thinking agent is preferably activated at a temperature of between 82° C. and 121° C. (180° F. and 250° F.), with boron trichloride amine complexes being proposed. The epoxy diluent is preferably contained in a quantity of 5 to 12% by weight, preferably in a quantity of 8 to 10% by weight, preferably in a quantity of 9% by weight, of the total quantity of the matrix resin. The latent cross-linking agent is preferably contained in a quantity of 1 to 10% by weight, preferably in a quantity of 3 to 7% by weight, preferably in a quantity of 5% by weight, of the total quantity of the matrix resin.

BRIEF DESCRIPTION OF THE DRAWINGS

The invention will be explained below in closer detail by reference to embodiments shown in the drawings, wherein.

DETAILED DESCRIPTION OF THE EMBODIMENTS

The insulating molding part in accordance with the invention with an upper part 7 and a bottom part 8 can have different configurations. The upper part 7 and the bottom part 8 can be made of composite materials of different composition, or the upper part 7 can be provided with a decorative surface. Furthermore, the upper part 7 and the bottom part 8 can be provided with additional insulating walls 10. In this case, a mold with several cavities is required, with the composite material of the upper part 7 being introduced into a first mold in a first method step as a decorative material by way of screws or also with a pressure cylinder in the case of rock in order to not grind the granulate. For this purpose, a negative pressure is produced in a supporting manner in the first mold. Once the composite material of the upper part 7 has been introduced, the upper mold half is exchanged and a second mold which contains a fusible core with the individual fusible bodies is positioned on the first mold. The two molds are pressed together and the composite material of the bottom part 8 is injected under negative pressure, which bottom part encloses the fusible core. The individual fusible bodies are in connection with the exterior via openings 1 in the second mold, so that the molten material can subsequently escape to a tempered melt bath for example. A negative pressure, preferably a vacuum, can be produced in the thereby obtained cavities of the chambers 3 via the openings 1 which are arranged in a conical manner for example. Not only residual fusible core material but also any vapors produced during the curing process will be removed from the curing composite material. Preferably, a negative pressure of approximately 5 mbar is produced in the cavities of the chambers 3, which negative pressure can also vary depending on the wall thickness of the webs 4 between the individual chambers 3. The openings 1 can subsequently be sealed off in an air-tight manner by means of a vulcanizing material, balls made of silicone, etc. The composite material sufficiently cures in the two molds during the application of the negative pressure, so that the finished insulating molding part can be removed from the mold without any problems. Curing can be completed under UV radiation after the removal from the molds. If no decorative surface is desired, only one single mold with inserted fusible core is necessary.

The fusible core needs to be cast or sprayed initially in order to enable producing the desired insulating molding part from the composite materials in the mold. The fusible core consists in the known manner of a material that melts at a comparatively low temperature such as tin-bismuth alloys or wax materials. The fusible core will subsequently be inserted into a mold and sprayed with the composite material. Subsequently, the fusible core needs to be molten out of the plastic injection-molded part, which occurs in an electro-inductive way in an aliphatic alcohol as the heat carrier or by means of UV light. The fusible core residues which will not automatically flow out of the cavities of the chambers 3 will be removed by oscillating movements in the heat carrier fluid. The molten fusible core material accumulates on the bottom part of the container in fluid phase and is supplied to the casting installation again, by means of which the cycle for the fusible core material is closed.

The insulating molding part can be produced in a simple embodiment even without the insulating walls 10. If a decorative surface is desired in this case, two molds with a cavity each are required, with the composite material of the upper part 7 being introduced at first by screws or the pressure cylinder. Depending on the specific weight of the composite material, it will sink or rise within the mold. Once the composite material has been introduced, a change is made to the upper half of the mold and a second mold is positioned on the first mold. Within the scope of a second injection-molding process which can already commence in the tenacious state of the composite material of the upper part 7, the composite material of the bottom part 8 will now be injected and the second cavity will be filled. The curing of the composite material already starts during the second injection-molding process and continues subsequently to such an extent that the insulating molding part can be removed from the mold with ease. The first and second injection-molding process are respectively supported by means of negative pressure, with any vapors being removed which are produced in the course of the curing of the respective composite materials. If no decorative surface is desired, only one single mold with one cavity is necessary.

The matrix resin of the composite material must have a very low injection viscosity for the application in accordance with the invention. So-called "two-component" epoxy resin compositions in which the cross-linking and resin components need to be joined directly before use could principally be used. Furthermore, "single-component" epoxy resin compositions are known which need to be stored under controlled low temperatures in order to prevent cross-linking reactions and extending the storage period. Epoxy-resin-based compositions which are used as matrix resins comprise at least one aromatic polyepoxide, a fluoron-containing epoxy and a 9,9-bis(aminophenyl)fluorine curing agent. The matrix resin is a heavy paste which needs to be heated, so that it can be injected into the molds. The mold needs to be heated to at least 176.7° C. (350° F.) in order to cure the epoxy-resin-based composition.

In accordance with the invention, stable compositions are preferable with a low viscosity at room temperature, and which are curable at temperatures of between 93.3 and 121.1° C. (200 and 250° F.). Composite materials are proposed for this purpose comprising a fluid phenolic resin, a glycidyl-terminated epoxy diluent, and at least one latent cross-linking agent, and additions of natural materials or recycling materials.

Suitable phenolic resins are epoxy resins comprising epoxy Novolakes such as ARALDITE® EPN 1138 (epoxy value 0.55 to 0.57 equ./100 g), ARALDITE® EPN 1139 (epoxy value 0.56 to 0.58 equ./100 g) and DEN® 438 (epoxy value 0.55 to 0.57 equ./100 g), but are not limited to the same. Examples of preferred epoxy resins are fluid compositions which are based on 2,4-dimethylene phenol glycidyl ether, 2,6-dimethylene phenol glycidyl ether und and mixtures thereof.

A polymer mixture which is based on 2,4-dimethylene phenol glycidyl ether monomer and 2,6-dimethylene phenol glycidyl ether monomer is preferred. The epoxy resin component is provided in the epoxy resin composition in a quantity of approximately 60 to 90% by weight, preferably in a quantity of approximately 80 to 90% by weight, preferably in a quantity of approximately 85% by weight of the entire epoxy resin composition.

The epoxy diluent is preferably a glycidyl-terminated compound. Compounds are especially preferred which contain glycidyl or methyl glycidyl groups which are bonded directly to an atom of oxygen, nitrogen or sulphur. The resins comprise polyglycidyl and poly (methyl glycidyl) ester which can be obtained by conversion of a substance which contains two or more carboxylic acid groups per molecule with epichlorhydrine, glycerol dichlorhydrine or methyl epichlorhydrine in the presence of alkali.

The polyglycidyl esters can be obtained from aliphatic carboxylic acids such as oxalic acid, succinic acid, adipic acid, sebacic acid or dimerized or trimerized lipolenic acid, from cycloaliphatic carboxylic acids such as hexahy-drophthalic acid, 4-methyl hexahydrophthalic acid, tetrahy-drophthalic acid and 4-methyl tetrahydrophthalic acid, or from aromatic carboxylic acids such as phthalic acid, isophthalic acid and terephthalic acid.

Other epoxy resins that can be used comprise polygly-cidyl and poly (methyl glycidyl) ether which can be obtained by the conversion of substances which contain per molecule two or more alcoholic hydroxyl groups or two or more phenolic hydroxyl groups, with epichlorhydrine, glycerol dichlorhydrine or methyl epichlorhydrine, under alkaline conditions or, alternatively, in the presence of an acid catalyst with subsequent alkali treatment. Such polyglycidyl ethers can originate from aliphatic alcohols such as ethylene glycol and poly (oxyethylene) glycols such as diethylene glycol and triethylene glycol, propylene glycol and poly (oxypropylene) glycols, propane-1,3-diol, butane-1,4-diol, pentane-1,5-diol, hexane-1,6-diol, hexane-2,4,6-triol, glycerol, 1,1,1-trimethylol propane, and pentaerythritol, from cycloaliphatic alcohols such as chinite, 1,1-bis(hydroxym-ethyl cyclohex-3-en, bis(4-hydroxy cyclohexyl) methane, and 2,2-bis(4-hydroxy cyclohexyl) propane, or from alcohols which contain an aromatic core such as N,N-bis-(2-hydroxyethyl) aniline and 4,4'-bis(2-hydroxyethyl amino) diphenyl methane.

Preferably, the polyglycidyl ethers originate from substances which contain two or more phenolic hydroxy groups per molecule, e.g. resorcinol, catechol, hydrochinone, bis(4-hydroxyphenyl) methane, 1,1,2,2-tetrakis(4-hydroxyphe-nyl) ethane, 4,4'-dihydroxy diphenyl, bis(4-hydroxy phenyl) sulphone and especially phenol formaldehyde or cresol formaldehyde Novolak resins, 2,2-bis(4-hydroxy phenyl) propane (also known as bisphenol A) and 2,2-bis(3,5-di-bromo-4-hydroxy phenyl) propane.

Furthermore, poly(N-glycidyl) compounds can be used, which are obtained for example by the dehydrochlorination of the reaction products of epichlorhydrine and amines which contain at least two hydrogen atoms which are bonded directly to nitrogen such as aniline, n-butyl amine, bis(4-aminophenyl) methane, bis(4-aminophenyl) sulphone and bis(4-methyl aminophenyl) methane. Other poly(N-glycidyl) compounds that can be used comprise triglycidyl isocyanurate, N,N'-diglycidyl derivatives of cyclic alklyene urea such as ethylene urea and 1,3-propylene urea and N,N'-diglycidyl derivatives of hydantoins such as 5,5-dim-ethyl hydantoin. Epoxy resins which are obtained by the epoxidation of cyclic and acrylic polyolefins can be used, as also vinyl cyclohexene dioxide, limonene dioxide, dicyclo-pentadiene dioxide, 3,4-epoxy dihydrodicyclopentadienyl glycidyl ether, bis(3,4-epoxy dihydrodicyclopentadienyl) ether of ethylene glycol, 3,4-epoxy cyclohexylmethyl, 3,4'-epoxy cyclohexane carboxylate and its 6,6'-dimethyl derivative, bis(3,4-epoxy cyclohexancarboxylate) of ethylene glycol, acetal which was formed between 3,4-epoxy cyclohexane carboxyaldehyde and 1,1-bis(hydroxymethyl)-3,4-epoxy cyclohexane, bis(2,3-epoxy cyclopentyl) ether, and epoxidized butadiene or copolymers of butadiene with ethylenic compounds such as styrene and vinyl acetate.

Suitable alphatic or aromatic epoxy diluents are further butanediol diglycidyl ether, diglycidyl ether of ortho-tolui-dine, diglycidyl ether of neopentyl glycol. An especially preferred epoxy diluent is 1,4-diglycidyl oxybutane. Epoxy diluents are commercially available such as ARALDITE®DY 026SP of Ciba Specialty Chemicals Corporation.

The epoxy diluent component is provided in the epoxy resin composition in a quantity of approximately 5 to approximately 12% by weight, preferably in a quantity of approximately 8 to approximately 10% by weight, preferably in a quantity of approximately 9% by weight of the entire epoxy resin composition.

The latent cross-linking component will be preferably activated at a temperature of between 82° C. (180° F.) and 121° C. (250° F.). Examples of suitable latent cross-linking agents comprise boron trichloride amine complexes. The most preferable latent cross-linking agent is a boron trichloride amine complex which can be obtained under the brand name DY 9577 of Ciba Specialty Chemicals Corporation, Tarrytown, N.Y. Many boron trichloride amine complexes are commercially available.

The latent cross-linking component is provided in the epoxy resin composition in a quantity of approximately 1 to approximately 10% by weight, preferably in a quantity of approximately 3 to approximately 7% by weight, preferably in a quantity of approximately 5% by weight of the entire epoxy resin composition.

The composite material can concern polyurethane (PU) rigid foam of low thermal conductivity. Furthermore, thermosetting materials or other materials of low thermal conductivity can be used.

Materials such as glass fibers, talcum, quartz sand, calcium carbonate, titanium dioxide, barium sulfate and solid glass or hollow glass balls (for weight reduction) can be used as additions to the composite material. The so-called ball bearing effect of the miniature balls promotes the flow properties of the composite material. More constant surface structures are a further positive effect, as also the possibility for increasing production by lower shrinkage and warpage.

An important aspect of the present invention is that the employed composition for the composite material is stable at room temperature and is capable of curing at the temperature of between 93.3° C. and 121° C. (200 and 250° F.). Accordingly, the composition does not contain any other cross-linking agent other than a latent cross-linking agent or mixtures of latent cross-linking agents which reduce the stability or decrease the curing temperature. It is a further aspect of the present invention that the composition has a viscosity of approximately 10,000 mPa·s (10,000 cP) at 25° C., 800 mPa·s (800 cP) at 50° C., or 200 mPa·s (200 cP) at 70° C. Optionally, fillers can be added such as anti-foaming agents and the like. In addition to the filling and reinforcing substances, it is also possible to add functional additives such as antioxidant agents, light stabilizers, UV stabilizers, thermostabilizers, flame-retardants, lubricants, impact promoters, flexbilizers, dyes such as pigments and colorants, biostabilizers such as fungicidal and bactericidal additives, fungicides, propellants, nucleation agents, cross-linking agents and bonding agents for the purpose of influencing the processing capability. As a result, specific properties of the composite materials such as resistance to humidity or low flammability can be set in a purposeful manner.

The compositions as described above can be processed relatively easily, offer prolonged storage stability at room temperature, produce compositions with a high glass transition temperature (148.9-160.0° C. or 300-320° F.), cure at a temperature of 93.3° C. (200° F.), and offer a long latency period even at 70° C.

An embodiment of the method in accordance with the invention can therefore be provided as follows:
  a) Provision of a mold with one or several cavities.
  b) Injecting a composite material comprising a matrix resin into the mold, with the matrix resin comprising:
    1) a fluid phenolic resin;
    2) a glycydil-terminated diluent;
    3) at least one latent cross-linking agent which only cross-links when it is subjected to a temperature of at least 93.3° C. (200° F.), and
    4) additions of natural materials or recycling materials (additions of powdered mineral or comminuted pressed paper up to 40% of the total quantity of the composite material have proven to be possible during tests);
  c) Introduction of the transparent composite material via injection molding or die-casting.
  d) Changing the upper part of the first mold and positioning of a second mold with a fusible core in order to injection-mold around the edge and the bottom and cover parts of the insulating molding part with resin and recycling material and integrated pieces of film for UV radiation reduction.
  e) Removing the fusible core after removing the mold in the melt bath via the openings, by means of which the cavities of the chambers 3 are in connection with the outside.
  f) Producing a negative pressure in the cavities of the chambers 3 via the openings 1, and closing and sealing openings 1 with vulcanizing material.
  g) Heating the mold to at least 93.3° C. (200° F.) for a sufficient period of time in order to produce a partly cured solid insulating molding part.
  h) Removal of the insulating molding part from the mold and curing under UV radiation. The matrix resin will cure while it is subjected to vacuum. The application of the vacuum will remove any vapors produced during the curing process.

Figure 1:
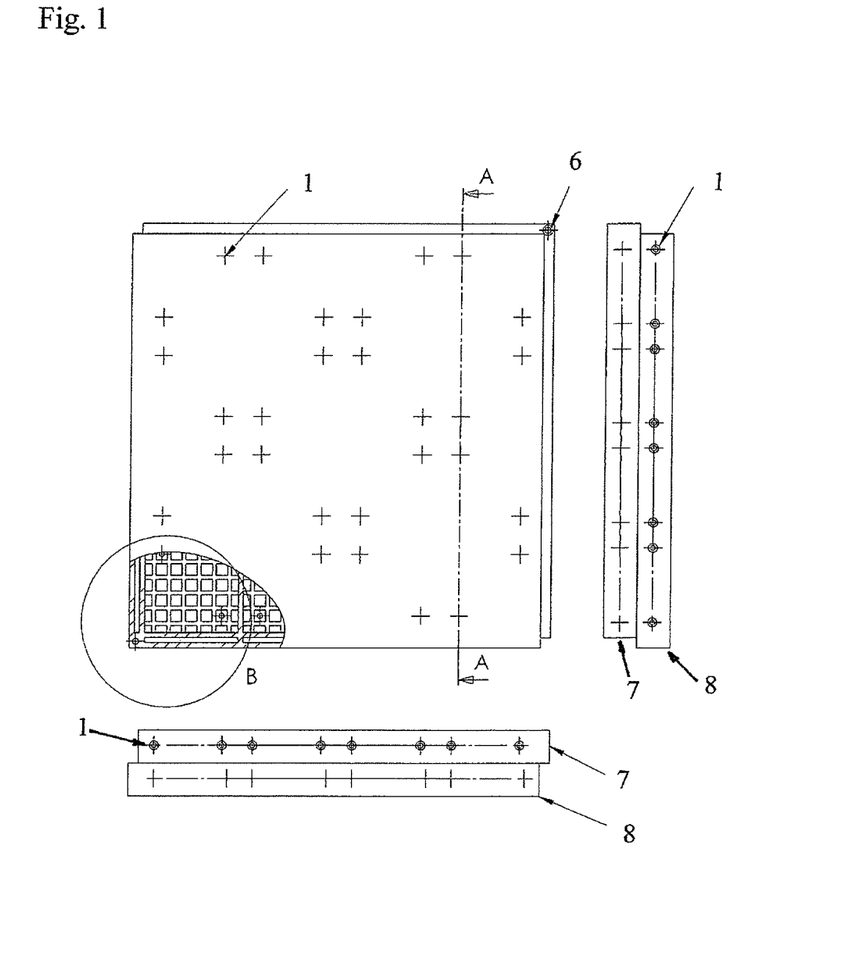
FIG. 1 shows an illustration of an embodiment of an insulating molding part in accordance with the invention in three different views.

The result of the method in accordance with the invention is an insulating molding part as is shown in FIGS. 1 to 5. FIG. 1 shows an illustration of an embodiment of an insulating molding part in accordance with the invention in three different views, with the openings 1 being shown via which the fusible core is removed from the cavities of the chambers 3 (shown in FIG. 2) and via which the chambers 3 are subsequently evacuated. The molding part can include several chambers 3, which in the illustrated embodiment includes 16 chambers 3. While only part of two chambers 3 are shown in the cut-away portion of FIG. 1, this cut-away portion is shown in greater detail in FIG. 2. From FIGS. 1 and 2, several chambers 3 therefore build up the insulating molding part, with the chambers being separated from one another in an air-tight manner via the webs 4. The breakthroughs 6 represent fastening holes.

Figure 2:
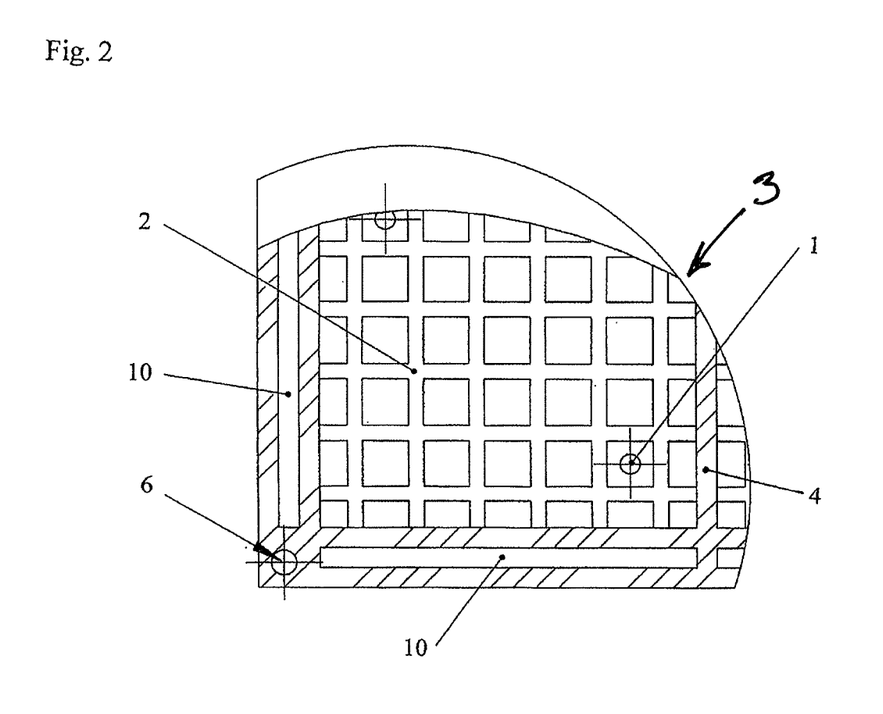
FIG. 2 shows an enlarged view of the inside view in the left bottom corner of FIG. 1.

FIG. 2 shows an enlarged illustration of the interior view in the left bottom corner of FIG. 1, in which a chamber 3 and the webs 4 are clearly shown. Furthermore, FIG. 2 shows that the openings 1 are chosen in such a way in the illustrated embodiment that two openings 1 are provided for each chamber 3, which openings are arranged diametrically opposed within the chamber 3. The surfaces of the chambers 3 show elevated surface sections 2.

Figure 3:
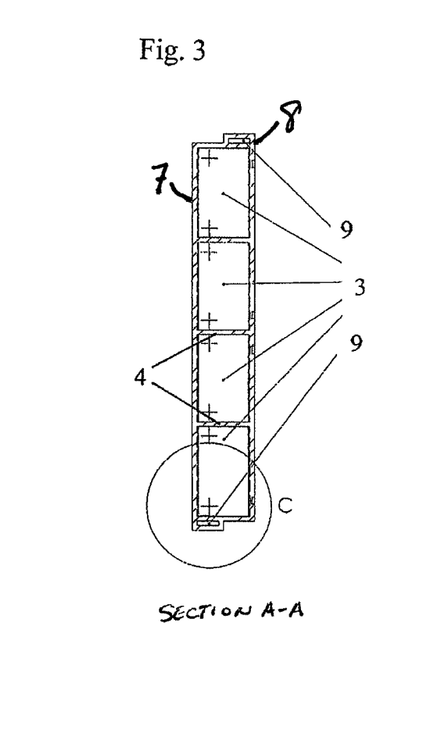
FIG. 3 shows a sectional view along the line A-A in FIG. 1.
Figure 5:
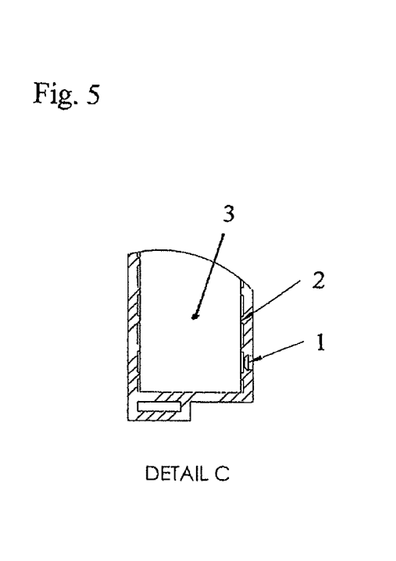
FIG. 5 shows an enlarged view of the detail "C" in FIG. 3.

FIG. 3 shows a sectional view along the line A-A in FIG. 1, with the individual chambers 3 being shown which are separated from one another in an air-tight manner via the webs 4. The upper part 7 and the bottom part 8 are respectively arranged in a cuboid manner in the illustrated embodiment, with the upper part 7 being slightly displaced in the diagonal direction in relation to the bottom part 8. A circumferential shoulder 9 is formed thereby, allowing an overlapping mounting of several insulating molded parts which rest on one another. Moreover, FIG. 5 shows an enlarged illustration of circled portion C, which shows in greater detail a cross-sectional arrangement of chamber 3, as depicted in FIG. 3. In the illustration, one of the openings 1 and elevated surface sections 2 for the depicted chamber 3 are shown.

Figure 4:
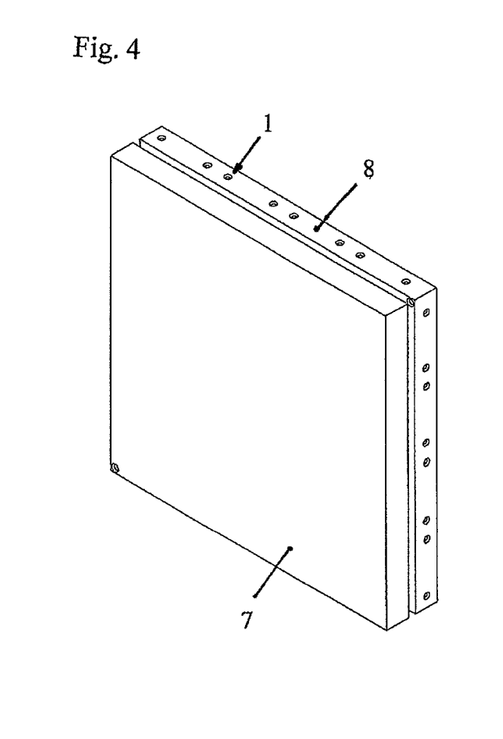
FIG. 4 shows a perspective view of an insulating molding part in accordance with the invention.

FIG. 4 shows a perspective view of an insulating molded part in accordance with the invention, comprising an upper part 7 which can be arranged as a decorative surface and a bottom part 8. Furthermore, the circumferential shoulder 9

(see FIG. 3) is shown with the fastening holes in form of breakthroughs 6 (see FIG. 2).

In accordance with a further embodiment of a method for producing an insulating molded part in accordance with the invention with an upper part 7 and a bottom part 8 it can also be provided that in a first method step within the scope of an injection-molding or die-casting method the composite material of the upper part 7 and the bottom part 8, respectively with additions from natural materials or recycling materials, is introduced into a three-part mold. The bottom part 8 is molded in a bottom mold half and the upper part 7 in an upper mold half under the presence of a middle mold part. The bottom part 8 with the bottom and the side walls is injected and simultaneously the upper part 7. The mold will be opened in a second method step and the middle mold part will be removed. As a result, the upper part 7 and the bottom part 8 are respectively removed from the mold on one of their sides, but remain in their respective mold halves. In a third method step, the two mold halves are closed again, by means of which the upper part 7 and the bottom part 8 are pressed against one another and the respective composite material is cross-linked. The first and the second method step must be performed in a sufficiently rapid way, so that the upper part 7 and a bottom part 8 are still present in the cross-linkable state before the third method step.

This production process will preferably be performed within a production space subject to negative pressure because in this case it is possible to omit the subsequent evacuation of the chambers 3. In this case, the injection-molding or die-casting machine is in a sealed room which is kept under negative pressure such as 3 mbar for example and is accessible via respective gates.

Furthermore, RIM (reaction injection molding) methods could be applied, both in the low-pressure and also high-pressure range.

Insulating molded parts are therefore provided with the help of the invention which can be produced easily and at low cost and offer good insulating capabilities and high stability.

The invention claimed is:

1. An insulating molded part, comprising:
   an upper part and a bottom part, the upper part and bottom part being respective portions of an injection molded or die-cast part;
   wherein cavities in an interior of the injection molded or die-cast part are arranged as chambers separated from one another in an air-tight manner,
   wherein the upper part and the bottom part are respectively formed in cuboid manners, and the upper part is offset in a diagonal direction in relation to the bottom part, and
   wherein at least one of the upper part and the bottom part comprises a composite material including at least one of natural materials and recycling materials, and contains a matrix resin comprising fluid phenolic resin, a glycidyl-terminated epoxy diluent, and at least one latent cross-linking agent.

2. An insulating molded part according to claim 1, wherein the upper part comprises a composite material including at least one of natural materials and recycling materials.

3. An insulating molded part according to claim 1, wherein the bottom part comprises a composite material including at least one of natural materials and recycling materials.

4. A method for producing the insulating molded part according to claim 1, comprising:
   in a first method step within the scope of an injection-molding or die-casting process, introducing the composite material of the upper part with additions of natural materials or recycling materials into a first mold, and
   in a second method step within the scope of a fusible core process, introducing the composite material of the bottom part with additions of natural materials or recycling materials into a second mold,
   wherein the second mold contains a fusible core with individual fusible bodies which are in connection with the exterior via openings in the second mold, and the fusible bodies are melted and escape after the second method step for forming individual chambers.

5. The method according to claim 4, wherein a negative pressure is produced after the melting out of the fusible bodies in the chambers and thereafter air-tight sealing of the chambers occurs.

6. The method according to claim 4, wherein the insulating molded part is subjected to after-curing by means of UV radiation.

7. The method according to claim 4, wherein the composite material of the upper part and the bottom part has a viscosity of 8,000-12,000 mPa·s (10,000 Centipoise) at 25° C.

8. The method according to claim 4, wherein the composite material of the upper part and the bottom part cures at a temperature of between 93.3° C. and 121.1° C. (200° F. and 250° F.).

9. The method according to claim 5, wherein the composite material of the upper part and the bottom part contains a matrix resin comprising a fluid phenolic resin, a glycidyl-terminated epoxy diluent, and at least one latent cross-linking agent.

10. The method according to claim 9, wherein the glycidyl-terminated epoxy diluent comprises 1,4-diglycidyl oxybutane.

11. The method according to claim 9, wherein the at least one latent cross-linking agent is activated at a temperature of between 82° C. and 121° C. (180° F. and 250° F.).

12. The method according to claim 11, wherein the at least one latent cross-linking agent comprises boron trichloride amine complexes.

13. The method according to claim 9, wherein the glycidyl-terminated epoxy diluent is contained in a quantity of 5 to 12% by weight of the total quantity of the matrix resin.

14. The method according to claim 13, wherein the glycidyl-terminated epoxy diluent is contained in a quantity of 8 to 10% by weight of the total quantity of the matrix resin.

15. The method according to claim 14, wherein the glycidyl-terminated epoxy diluent is contained in a quantity of 9% by weight of the total quantity of the matrix resin.

16. The method according to claim 9, wherein the at least one latent cross-linking agent is contained in a quantity of 1 to 10% by weight of the total quantity of matrix resin.

17. The method according to claim 16, wherein the at least one latent cross-linking agent is contained in a quantity of 3 to 7% by weight of the total quantity of matrix resin.

18. The method according to claim 17, wherein the at least one latent cross-linking agent is contained in a quantity of 5% by weight of the total quantity of matrix resin.

19. An insulating molded part according to claim 1 being formed by a process comprising:
   introducing a first composite material into an upper mold and a second composite material into a bottom mold so that the upper part and bottom part are respectively formed as portions of the injection molded or die-cast part in which the upper part is offset in a diagonal direction in relation to the bottom part; and cross-linking the first composite material and the second composite material, wherein the upper part and the bottom part are formed in cuboid manners, and the injection molded or die-cast part has interior cavities separated from one another in an air-tight manner, and wherein at least one of the first composite material and the second composite material comprises at least one of natural materials and recycling materials, and contains a matrix resin comprising fluid phenolic resin, a glycidyl-terminated epoxy diluent, and at least one latent cross-linking agent.

20. An insulating molded part according to claim 1 being formed by a process comprising:

forming the upper part formed from a first composite material which is introduced into a first mold, and forming the bottom part from a second composite material which is introduced into a second mold containing a fusible core with individual fusible bodies which are in connection with an exterior via openings in the second mold;

forming, by the fusible bodies melting and escaping, cavities in an interior of the injection molded or die-cast part that are arranged as chambers separated from one another in an air-tight manner, respectively forming the upper part and the bottom part in cuboid manners, wherein the upper part is offset in a diagonal direction in relation to the bottom part, and wherein at least one of a first composite material and the second composite material comprises at least one of natural materials and recycling materials, and contains a matrix resin comprising fluid phenolic resin, a glycidyl-terminated epoxy diluent, and at least one latent cross-linking agent.

21. An insulating molded part, comprising:

an injection molded or die-cast part defining an upper part and a bottom part;

webs arranged between an interior of the injection molded or die-cast part to define cavities as separated chambers having negative pressures, wherein the separated chambers are separated from one another in an air-tight manner, and wherein the upper part and the bottom part are cuboid forms that are offset from each other in a diagonal direction, and wherein at least one of the upper part and the bottom part comprises a composite material including at least one of natural materials and recycling materials, and contains a matrix resin comprising fluid phenolic resin, a glycidyl-terminated epoxy diluent, and at least one latent cross-linking agent.

22. An insulating molded part according to claim 21 being formed by a process comprising:

introducing a first composite material into an upper mold and a second composite material into a bottom mold to form the injection molded or die-cast part defining the upper part and bottom part, respectively, which are cuboid forms offset from each other in a diagonal direction; and cross-linking the first composite material and the second composite material, wherein the separated chambers having negative pressures are separated from one another in an air-tight manner in an interior of the injection molded or die-cast part, and wherein at least one of the first composite material and the second composite material comprises at least one of natural materials and recycling materials, and contains a matrix resin comprising fluid phenolic resin, a glycidyl-terminated epoxy diluent, and at least one latent cross-linking agent.

23. An insulating molded part according to claim 21 being formed by a process comprising:

forming the upper part from a first composite material which is introduced into a first mold, and forming the bottom part from a second composite material which is introduced into a second mold containing a fusible core with individual fusible bodies that are in connection with an exterior via openings in the second mold;

forming, by the fusible bodies melting and escaping, webs arranged between an interior of the injection molded or die-cast part to define cavities as separated chambers having negative pressures, wherein the separated chambers are separated from one another in an air-tight manner, and wherein the upper part and the bottom part are cuboid forms that are offset from each other in a diagonal direction, and wherein at least one of a first composite material and the second composite material comprises at least one of natural materials and recycling materials, and contains a matrix resin comprising fluid phenolic resin, a glycidyl-terminated epoxy diluent, and at least one latent cross-linking agent.

* * * * *